United States Patent [19]

Negri et al.

[11] Patent Number: 4,802,407
[45] Date of Patent: Feb. 7, 1989

[54] AUTOMATIC ELECTRIC HOUSEHOLD APPLIANCE FOR MAKING CHEESE AND BY-PRODUCTS THEREOF

[75] Inventors: Cesare Negri, Piacenza; Giorgio Bonini, Carpaneto; Giorgio Libe', Pontenure, all of Italy

[73] Assignee: Philips S.p.A., Italy

[21] Appl. No.: 55,782

[22] Filed: May 29, 1987

[30] Foreign Application Priority Data

Jun. 5, 1986 [IT] Italy ............................ 44807 A/86
Mar. 20, 1987 [IT] Italy ............................ 44801 A/87

[51] Int. Cl.[4] ........................... A23C 3/02; A23C 9/00
[52] U.S. Cl. ............................ 99/453; 99/348; 99/466; 366/145; 366/146; 366/261; 366/287
[58] Field of Search ............... 219/429, 430, 432, 435, 219/441, 451, 386; 99/452, 453, 455, 348, 460, 466; 62/342; 366/98, 144–146, 197, 199, 200, 201, 206, 207, 279, 331, 344, 288, 261, 287

[56] References Cited

U.S. PATENT DOCUMENTS

| | | | |
|---|---|---|---|
| 4,009,368 | 2/1977 | Faivre et al. | 99/453 X |
| 4,070,957 | 1/1978 | Korekawa et al. | 99/455 |
| 4,551,026 | 11/1985 | Cristante | 366/149 |
| 4,583,863 | 4/1986 | Pandolfi | 62/342 X |
| 4,643,583 | 2/1987 | Cecchini | 366/149 |
| 4,664,529 | 5/1987 | Cavalli | 99/455 |
| 4,693,610 | 9/1987 | Weiss | 366/146 |
| 4,706,558 | 11/1987 | Snyder, Jr. | 99/348 |

Primary Examiner—Timothy F. Simone
Attorney, Agent, or Firm—Steele, Gould & Fried

[57] ABSTRACT

The appliance comprises a housing seat for a milk container removable from said seat, a system of electrical heating resistances associated with said seat near the container, an agitator inserted in a removable manner from the container and an electric motor for driving the agitator. Thermostat means with two temperatures associated with an electrical control circuit act on the system of resistances and on the electric motor to consent automatic performance of an appropriate operation sequence for production of cheese and by-products thereof.

11 Claims, 9 Drawing Sheets

AUTOMATIC ELECTRIC HOUSEHOLD APPLIANCE FOR MAKING CHEESE AND BY-PRODUCTS THEREOF

BACKGROUND OF THE INVENTION

The present invention relates to an automatic electric household appliance for making cheese and by-products thereof.

Cheese making today is essentially of the industrial type, being performed by considerably complex, cumbersome and costly machines.

But there is a lack of small electric household appliances permitting the making of small quantities of cheese in the home rapidly and without problems.

The object of the present invention is to accomplish an automatic electric household appliance for making cheese and the by-products thereof which would be usable in the home, even by housewives with no cheese making skill or experience.

SUMMARY OF THE INVENTION

In accordance with the invention said object is achieved by an electric household appliance characterized in that it comprises a housing for a milk container withdrawable from said housing, a system of electric heating resistances associated with said housing near said container, an agitator inserted in a removable manner in said container, an electric drive motor for said agitator and two-temperature thermostatic means acting on said system of resistances and said motor in such a manner as to bring about the following operational sequence: (a) electrical power supply of the resistances and agitator drive motor until a first preset temperature is reached corresponding to the curdling temperature of the milk in the container, (b) continuing power supply of the motor for a preset short time suitable for addition of the coagulant to the milk, (c) activation of a waiting period with no power to the resistances and the motor stopped for conversion of the milk into cheese curd, (d) resumption of power supply to the resistances and motor until there is reached a second preset temperature higher than the first suitable for breaking the curd and conversion thereof into cheese and surrounding liquid, and (e) withdrawal of the container from its seat and physical separation of the cheese from the liquid by drainage.

BRIEF DESCRIPTION OF THE DRAWINGS

The characteristics of the present invention will be made clearer by the following detailed description of some forms of practical embodiment thereof illustrated as examples in the annexed drawings wherein.

DESCRIPTION OF THE PREFERRED EMBODIMENTS

Figure 1:
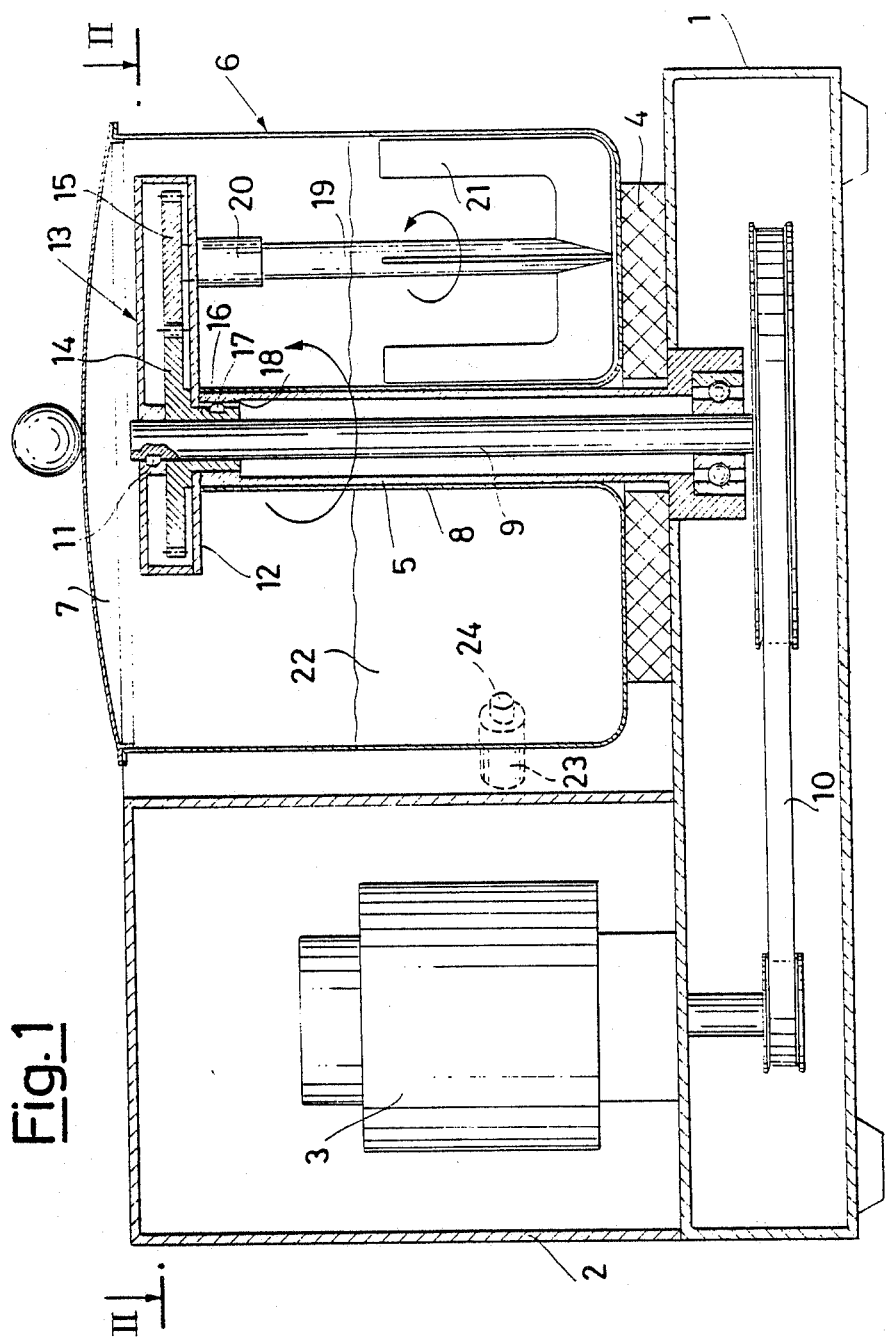
FIG. 1 shows an axial cross section of a first embodiment of the appliance of the invention along line I—I of FIG. 2.
Figure 2:
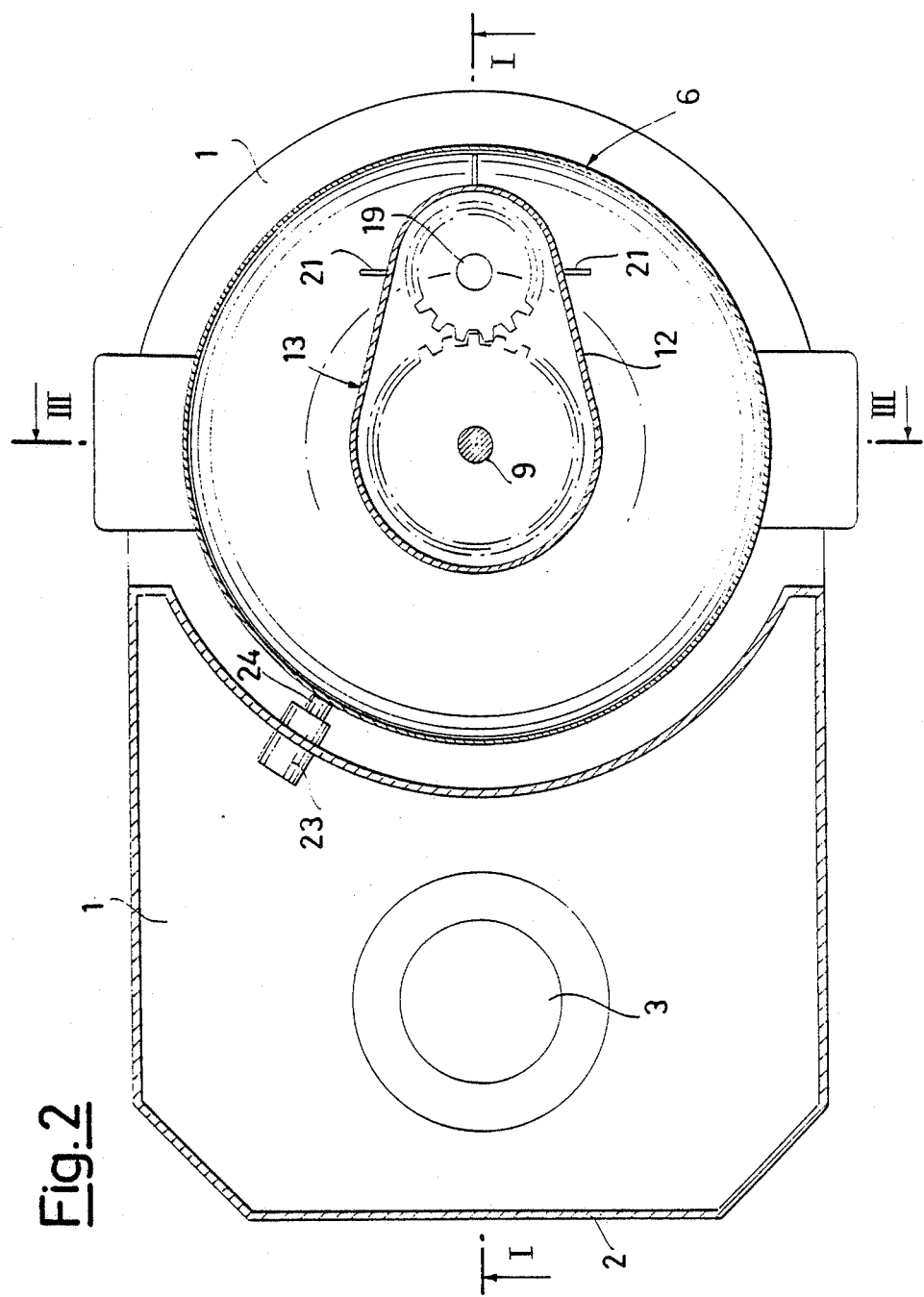
FIG. 2 shows a horizontal cross section of said apparatus along line II—II of FIG. 1.
Figure 3:
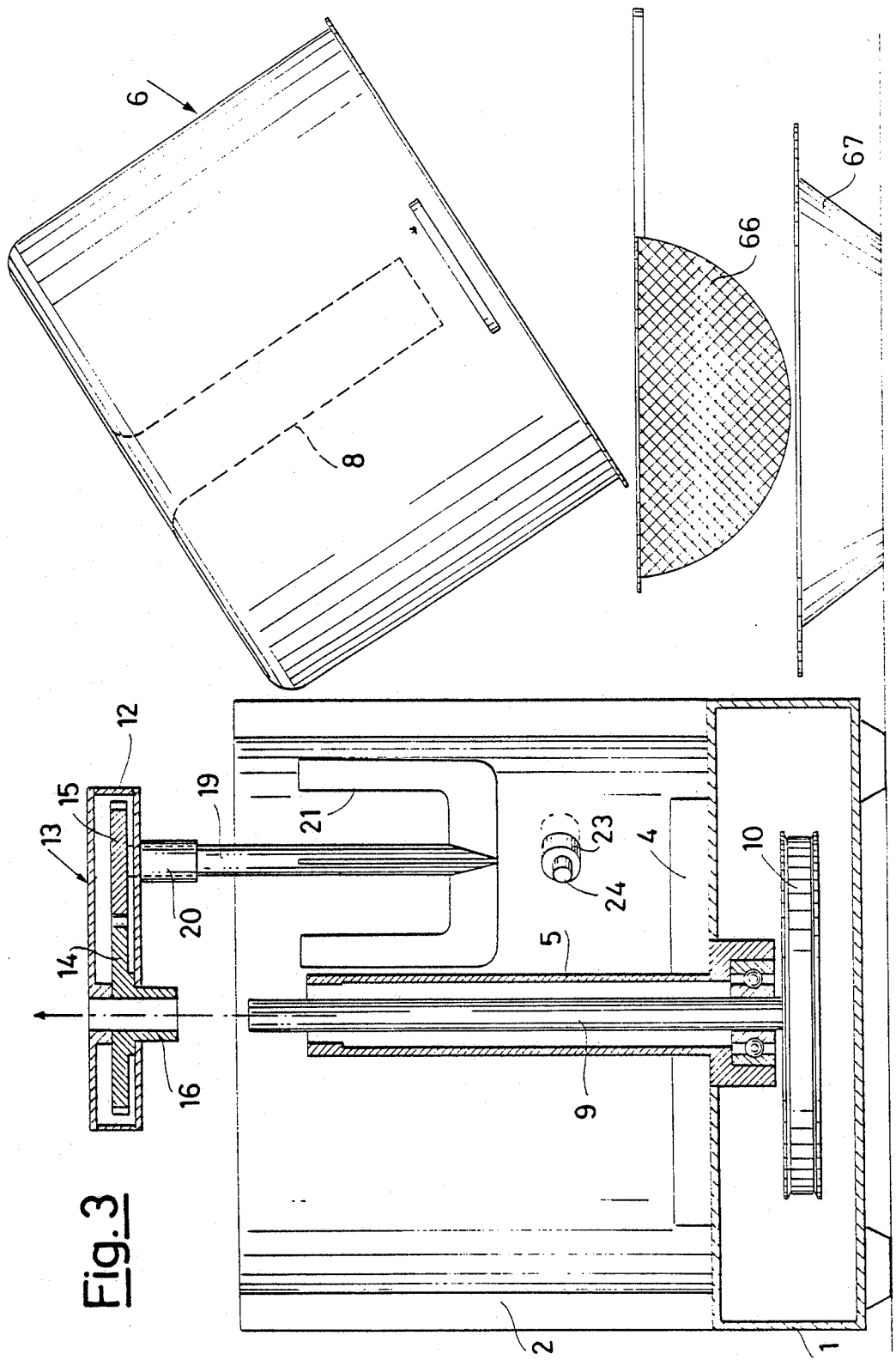
FIG. 3 shows a cross section of said appliance along line III—III of FIG. 2 in the final stage of its operational sequence.

The appliance illustrated in FIGS. 1-3 comprises a base 1 on which is mounted a closed housing 2 for an electric motor 3.

On said base 1 beside the housing 2 there is placed a system of electrical resistances 4 in the form of a plate which together with a hollow central column 5 forms a housing for a milk container 6 made of heat-conducting material and equipped with a removable cover 7. As shown in FIGS. 1 and 3 the container 6 has a central tube 8 designed to receive the column 5 when the container is placed in operating position on the electric plate 4.

The hollow column 5 serves as a turning support for and passage of a shaft 9 which is made to rotate by the motor 3 through a belt transmission 10 housed in the base 1. At the top of the shaft 9 there is restrained for rotation in an axially withdrawable manner by a key 11 the outer shell 12 of a rotating head 13 which houses two cooperating gears 14 and 15 of different diameters. The larger gear 14 is fixed integrally to a support sleeve 16 restrained for rotation in an axially withdrawable manner by a key 17 to a bush 18 fixed to the top of the hollow column 5 (FIG. 1). The smaller gear 15 is in turn keyed onto another shaft 19 parallel to the shaft 9 and supported in a turning manner in a sleeve 20 fixed to the shell 12 of the head 13 and bears on its lower end an agitator 21 inserted in the container 6 in immersion in the milk 22.

With the container 6 is associated externally a thermostat element 23 having a sensitive probe.

Figure 4:
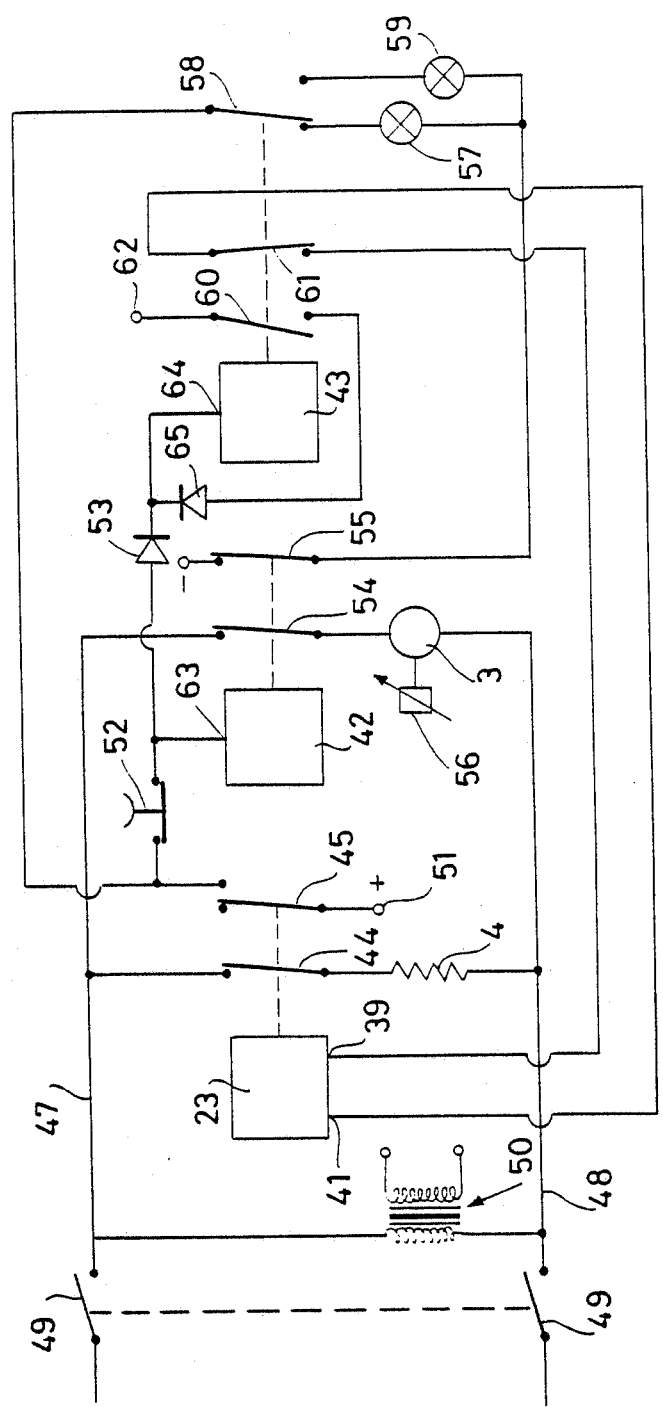
FIG. 4 shows the general diagram of the electrical control circuit of said apparatus.

The thermostat element 23 is included in the electric control circuit of FIG. 4 on which depends the automatic performance of the operating sequence of the appliance.

Figure 5:
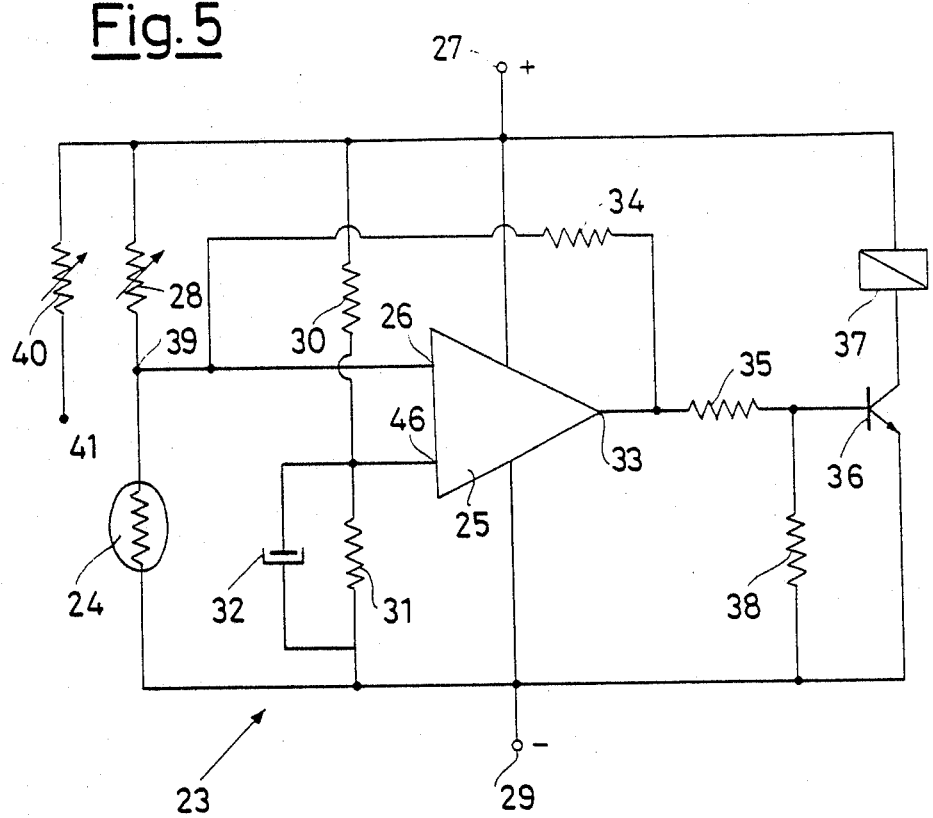
FIG. 5 shows the details of the circuit of the thermostatic control unit of the control circuit of FIG. 4.

An example of practical embodiment of said thermostat element is illustrated in FIG. 5 and comprises an operational amplifier 25 which has a first input 26 connected to a circuit node 39 which is in turn connected to a positive terminal 27 through a first adjustable resistance 28 and a negative terminal 29 through a heat sensitive resistance identifiable in the thermal prove 24, a second input 46 connected to the positive terminal 27 through a resistance 30 and to the negative terminal 29 through the parallel of a resistance 31 and of a condenser 32, and the output 33 connected in feedback to the first input 26 through a resistance 34 and also connected through a resistance 35 to the base of an NPN transistor 36 which has its collector connected to the positive terminal 27 through the coil of a relay 37, its emitter connected to the negative terminal 29 and its base connected to said negative terminal through a resistance 38. A second adjustable resistance 40 is placed between the positive terminal 27 and a circuit node 41 which is in turn connectable to the circuit node 39, i.e. in parallel or not with the first adjustable resistance 28 depending on the position of a contact provided in the electric control circuit shown in FIG. 4 as will be explained below.

In addition to the thermostat element 23 just described the control circuit shown in FIG. 4 comprises two timers 42 and 43, the first preset for a short period such as 30 seconds and the second preset for a longer period such as 12 minutes.

Both the thermostat element 23 (and to be precise its relay 37) and the two timers 42 and 43 control electrical switching contacts for performance of the operating sequence of the appliance. More precisely, the thermostat element 23 controls a normally closed contact 44 and a normally open contact 45 the first of which controls application of the electrical heating resistance 4 between the two 220 V alternating current supply wires 47 and 48, which are controlled by a 2-pole main switch 49 from which a transformer 50 takes the low voltage (12 V) which, after rectification, supplies the thermostat element 23 and the timers 42 and 43 while the second contact 45 controls the connection of a positive supply terminal 51 (12 V) to the unit comprising said timers 42 and 43.

Through the contact 45 when closed the positive terminal 51 is connected through a normally closed pushbutton switch 52 to the control input 63 of the timer 42 and then through a diode 53 to the control input 64 of the timer 43.

The timer 42 controls two normally closed contacts 54 and 55 the first of which controls the alternating current supply for the electric motor 3 (fitted with a speed regulator 56) and the second controls the supply for a warning light 57 (optionally associated with an audible alarm) in combination with another contact 58 which alternatively selects the lamp 57 or another lamp 59 (also optionally with an associated audible alarm).

The contact 58 is controlled by the timer 43 together with a normally open contact 60 and a normally closed contact 61. The contact 60 controls connection of a positive terminal 62 (12 V) to the control input 64 of the timer 43 through a diode 65. The contact 61 controls in turn connection together of the above described circuit nodes 39 and 41 of the thermostat element 23, i.e. connection in parallel of the two adjustable resistances 28 and 40 of said thermostat element 23.

There derives therefrom the following manner of operation of the electric household appliance illustrated in FIGS. 1–3.

Once the container 6 is fitted with milk and positioned in the seat formed by the electric plate 4 and the hollow column 5, the main switch 49 is closed to feed electric power to the control circuit shown in FIG. 4.

The closed contact 44 than allows supply of electric power to the heating resistances in the plate 4 which heats the milk through the wall of the container 6. The temperature of the said milk is sensed by the thermal probe 24.

Simultaneously the closed contact 54 allows supply of electric power to the motor 3 which, through the belt transmission 10, the shaft 9, the rotating head 13 and the shaft 19, transmits to the agitator 21 a double rotation in concordant direction around the axis of the hollow column 5 and around the axis of the shaft 19. The first rotation is caused by direct engagement of the shaft 9 with the shell 12 of the head 13 while the second rotation, simultaneous with the first, is caused by the rolling of the smaller gear 15, which is transmitted by said rotation of the shell 12, around the periphery of the fixed larger gear 14.

This stage of operation ends when the milk reaches a first preset temperature (e.g. 27° C.) of the total value of the two adjustable resistances 28 and 40 of the thermostat element 23 kept in parallel by the closed contact 61. Said temperature is set in such a manner as to be equal to the ideal curdling temperature of the milk.

At this point the operational amplifier 25 (FIG. 5) commands conduction of the transistor 36 and the consequent operation of the relay 37 which causes commutation of the contacts 44 and 45 (FIG. 4) to open and closed respectively.

Opening of the contact 44 stops electrical power supply of the heating plate 4 while closing the contact 45 starts the timers 42 and 43 and through the contacts 58 and 44 causes lighting of the warning lamp 57 and activation of any associated audible alarm.

At this point the housewife introduces the coagulant into the milk while the motor 3 continues to operate to allow the agitator 21 to appropriately mix the coagulant with the mass of milk in the container 6.

The motor stops at the end of the time (e.g. 30 seconds) preset for the timer 42 when the contact 54 opens, stopping power supply to the motor 3. Simultaneously, the contact 55 opens also, extinguishing the lamp 57.

The operating sequence now pauses, waiting time being set on the timer 43. In this stage all the members of the appliance are stopped while in the mass of milk a chemical and physical conversion of the milk into cheese curds is taking place. The duration of this stage may be varied depending on the quantity and quality of coagulant used.

At the end of the period (e.g. 12 minutes) set on the timer 43 the contact 60 closes to cause through the diode 65 stopping of the timer 43 in the state reached while the contact 58 moves toward the lamp 59 (which however remains extinguished, the contact 55 being open) and the contact 61 opens, eliminating the adjustable resistance 40 from parallel with the other adjustable resistance 28.

Consequently the temperature preset for the thermostat element 23 rises (e.g. to 48° C.) and said thermostat element commands return of the contacts 44 and 45 to the orignal closed and open positions respectively. The electrical resistance 4 returns to being supplied and thus further heats the milk in the container 6 and the same takes place for the motor 3, the timer 42 and the contact 54 being brought back to their initial state.

When the new desired temperature, set at a value such as to facilitate separation of the curd from the liquid in which it is contained, has been reached the thermostat element 23 again commands in the manner already described stopping of the operation of the electrical resistance 4 and immediately afterwards of the motor 3. In addition, the contacts 45, 58 and 55 cause lighting of the warning lamp 59 (and activation of any audible alarm) to signal to the housewife the end of the sequence.

The housewife may then determine the further period during which the entire unit must remain stopped to allow natural decantation of the cheese flakes. Th time depends of course on the housewife's tastes. But if desired another timer can make this decantation stage preset and automatic.

When the housewife judges that the cheese is sufficiently firm she removes the cover 7, removes the agitator 21 from the container 6, sliding the head 13 off the shaft 9, and finally removes the container 6 (FIG. 3). The contents of said container 6 are poured into an ordinary colander 66 where the cheese is physically separated from the surrounding liquid, which is collected in an underlying receptacle 67.

Figure 6:
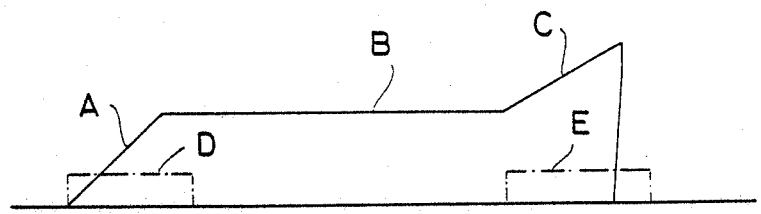
FIG. 6 shows an illustrative graph of the manner of operation of the appliance of the above figures.

The sequence just described is made visibly clear in FIG. 6 where graph lines A, B and C indicate the three phases of activation, pauses and reactivation of the electrical resistance 4 respectively and graph lines D and E indicate in turn the two stages of activation of the motor 3.

The purpose of the switch 52 is to stop the sequence at any desired moment.

Figure 7:
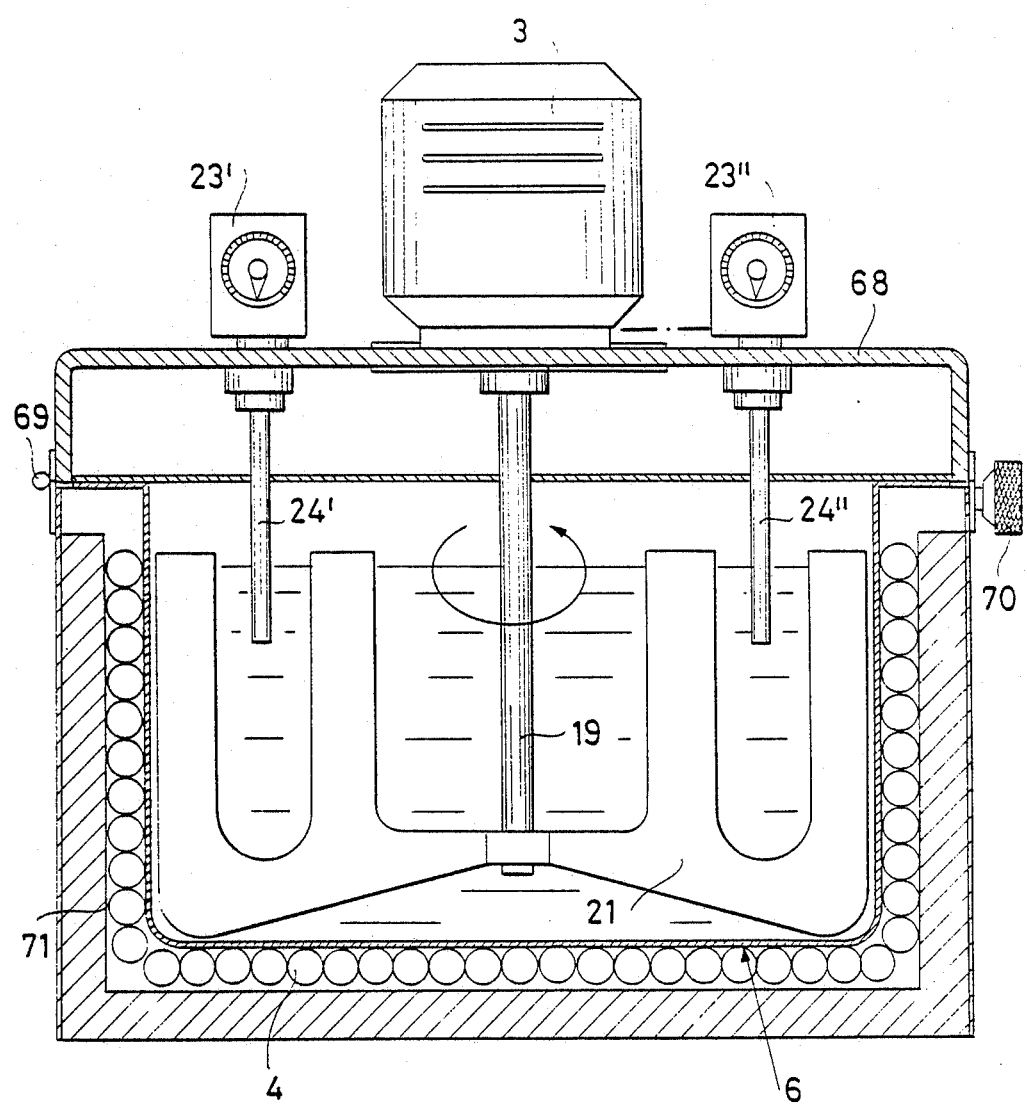
FIG. 7 shows an axial cross section of a second embodiment of the appliance in accordance with the invention.
Figure 8:
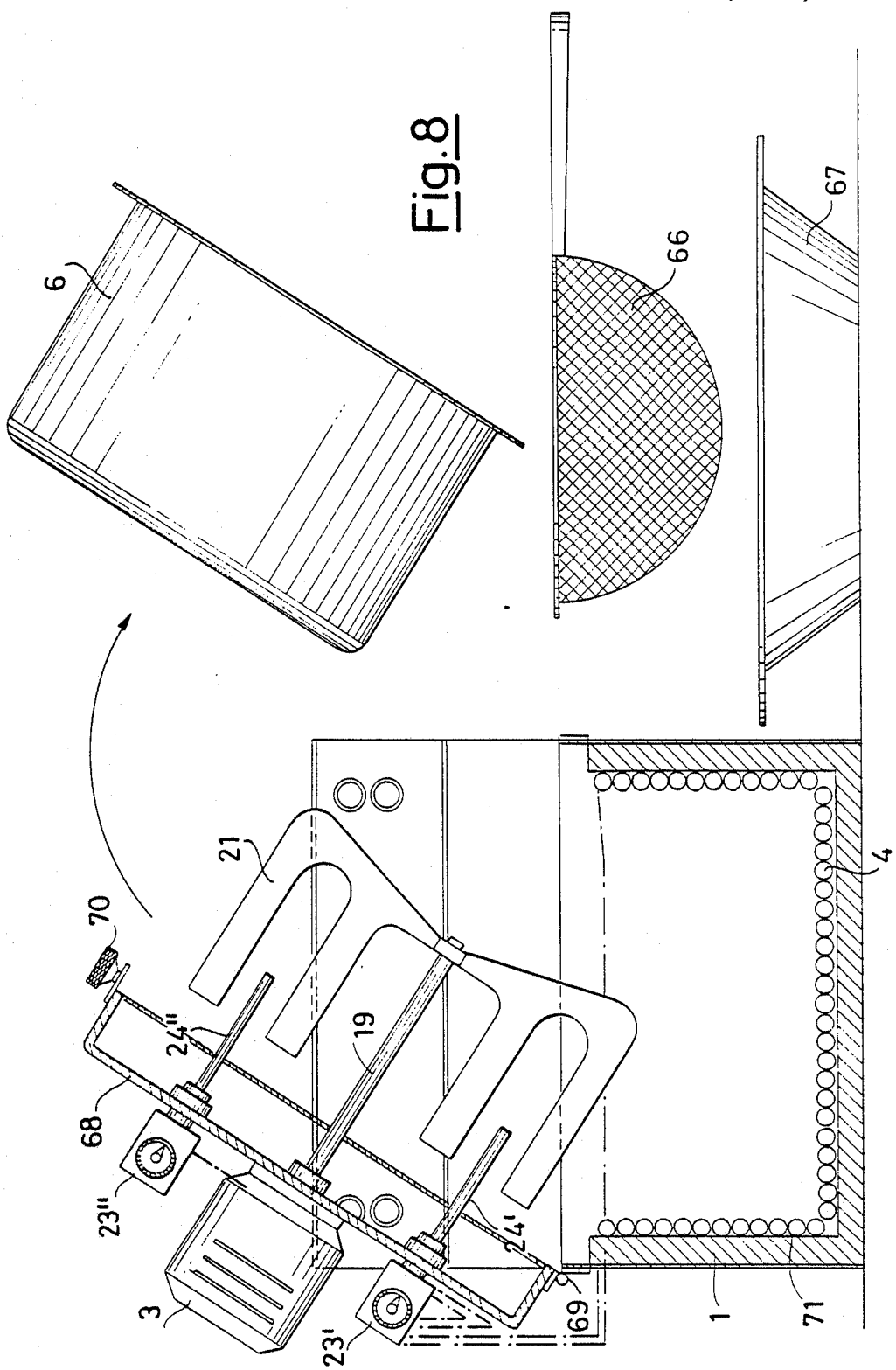
FIG. 8 shows said appliance in the final stage of its operating sequence.

Conceptually similar although of simpler construction is the appliance illustrated in FIGS. 7 and 8. Among the principal variants may be indicated the fact that the motor 3 is placed directly on top of the drive shaft 19 of the agitator 21 and is supported by a cover element 68 hinged at 69 and lockable at 70 on a base 1 formed this time like a vat 71 with an interior recess having a shape complementary to that of the container 6, which is virtually cylindrical. Furthermore the system of the electrical resistances 4 is made in spiral form wrapped inside of said housing recess of the container 6. Finally there are provided two thermometers 23' and 23" preset at different temperatures, each having its sensitive probe 24', 24". The electrical control circuit varies partially but the operating sequence remains the same. At the end, as shown in FIG. 8, the container 6 is withdrawn from the appliance to perform separation of the cheese from the liquid by a drain operation.

Figure 9:
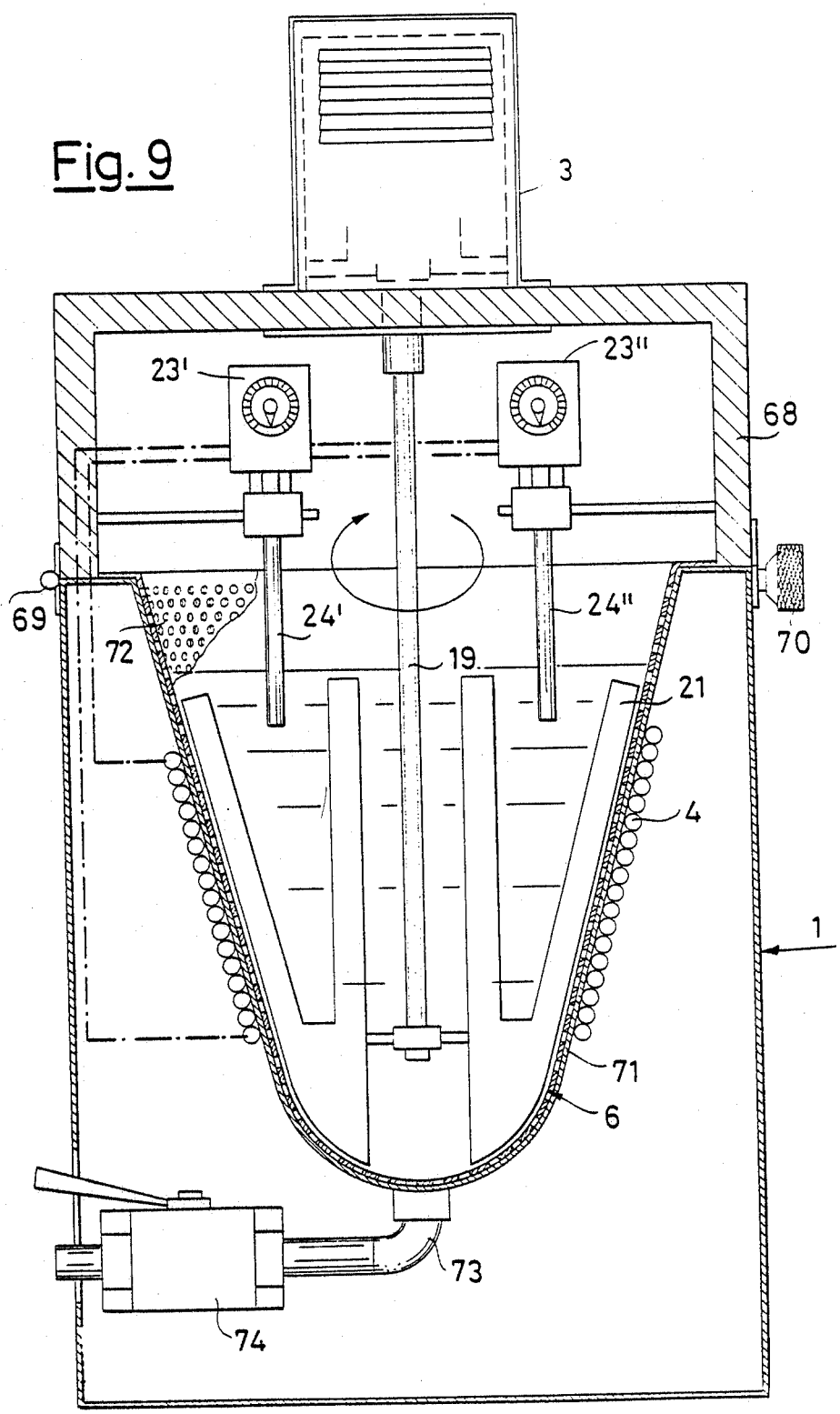
FIG. 9 shows an axial cross section of a third embodiment of the appliance in accordance with the invention.
Figure 10:
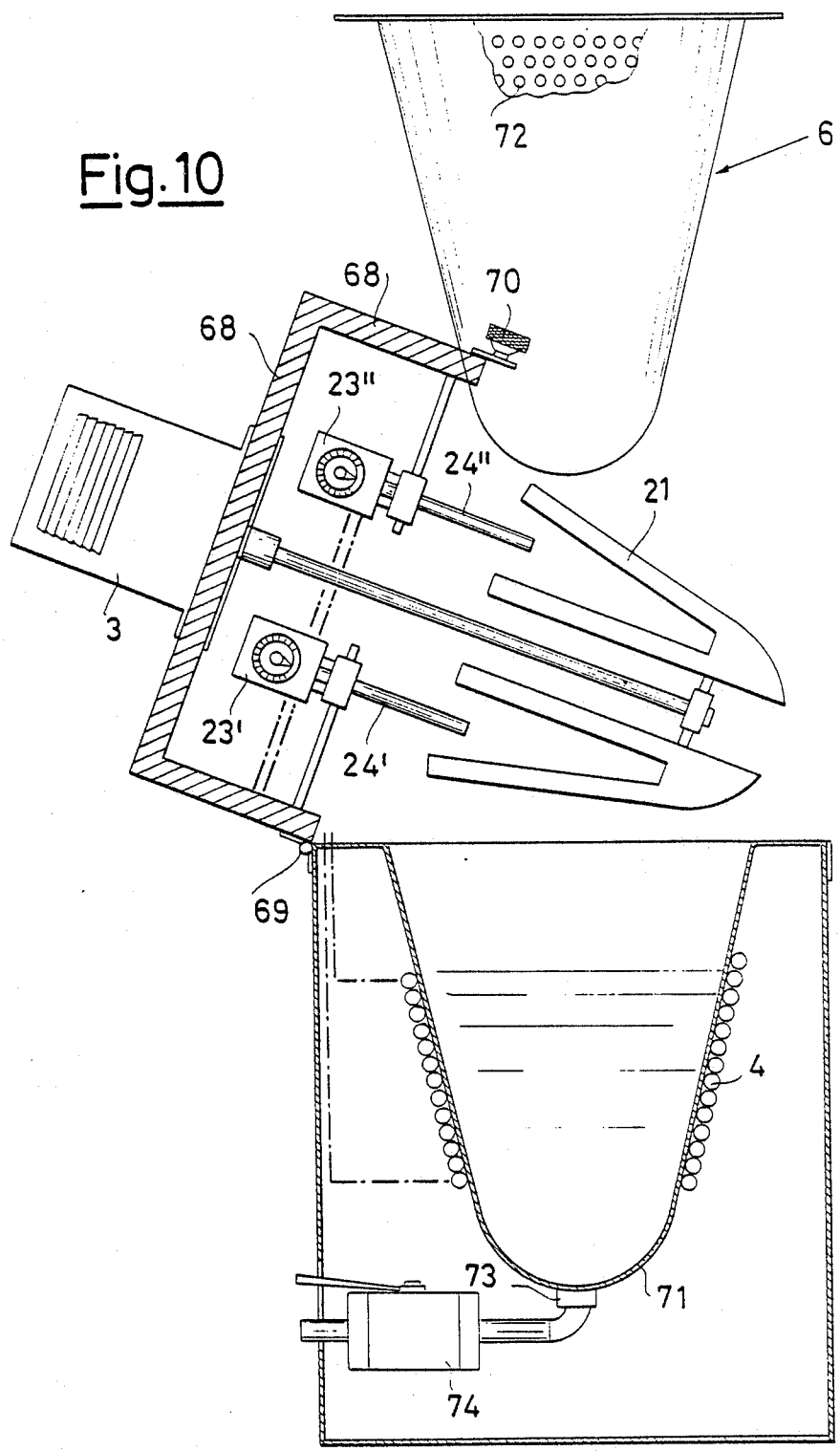
FIG. 10 shows said appliance in the final stage of its operational sequence.

Not dissimilar is the appliance illustrated in FIGS. 9 and 10. The principal variant with respect to that of FIGS. 7 and 8 lies in the fact that the base 1 forms a true watertight vat 71, essentially with a truncated cone form with a spherical bottom within which is housed the container 6, which has the same shape as the vat 71 but is pierced with holes distributed over the wall and bottom. The electrical resistance 4, again in spiral form, is wrapped around the side wall of the vat 71. The bottom of the vat communicates with a drain duct 73 fitted with a control valve 74. The operating sequence is the same but, at the end, the cheese is separated from the liquid by extracting the pierced container 6 from the vat 71 while the liquid is discharged through the duct 73.

What is claimed is:

1. An automatic electric household appliance for making cheese and by-products thereof, comprising a housing seat, a milk container which is removable from said seat, electric heating resistance means associated with said seat near said container, an agitator removably inserted in said container, an electric drive motor for said agitator and an electric control circuit including power supply means for said heating rsistance and said drive motor, two-temperature thermostat means responsive to a lower preselected temperature corresponding to the curdling temperature of milk in the container to stop electrical power supply to the heating resistance, first timing means activated by said thermostat means at said lower temperature to stop electrical power supply to the drive motor at the end of a shorter preselected time adequate for introduction of a coagulant in the milk, second timing means activated by said thermostat means at said lower temperature to restart electrical power supply to the heating resistance and the drive motor and to make the thermostat means responsive to a higher preselected temperature adequate for breaking the curd and converting the same into cheese and surrounding liquid at the end of a longer preselected time, said thermostat means being responsive to said higher temperature to stop electrical power supply to the heating resistances and the drive motor, means for allowing removal of the container from its seat and physical separation of the cheese from the liquid by draining.

2. The appliance in accordance with claim 1, wherein said control circuit comprises signalling means for indicating that said first and second preset temperatures have been reached.

3. The appliance in accordance with claim 1, wherein said housing seat for said container is formed of an electrical plate constituting said system of resistances and of a column extending upward from said plate, said container includes a hollow central tube which is fitted over said column.

4. The appliance in accordance with claim 3, wherein said agitator is inserted in said container laterally in relation to said central tube and said agitator has a double rotary motion around said central tube and around its own supporting shaft.

5. The appliance in accordance with claim 4, wherein said double rotary motion is composed of concordant rotations.

6. The appliance in accordance with claim 4, wherein said double rotary motion is secured through a rotating head formed of a shell rotated by said motor and bearing in a turning manner the supporting shaft of the agitator and by at least two cooperating gears housed in said shell and fixed one on a fixed support and the other on said shaft of the agitator.

7. The appliance in accordance with claim 6, wherein said shell of the rotating head is fixed in an axially removable manner to a drive shaft housed in a turning manner in said column and rotated by said motor.

8. The appliance in accordance with claim 7, wherein said housing seat of the container and said motor are placed side by side on a base in which is housed a system for transmission of the motion of said motor to said drive shaft.

9. The appliance in accordance with claim 1, wherein said housing seat of the container is formed by a base with an interior recess in the form of a vat and said system of resistance is made in the form of a spiral wrapped around the inside of said recess.

10. The appliance in accordance with claim 9, wherein said agitator is housed axially inside said container with said motor placed over it and supported by an openable covering element of said recess.

11. The appliance in accordance with claim 1, wherein said housing seat of the container is made in the form of a watertight vat having on the bottom a drain duct for the liquids fitted with a control valve and said container has a form complementary to that of said vat and has a pierced wall for separation of the cheese from the liquid by removal of the container from said vat.

* * * * *